United States Patent [19]
Gallo

[11] 4,144,943
[45] Mar. 20, 1979

[54] SCALE, IN PARTICULAR FOR WEIGHING BULK GOODS

[75] Inventor: Mario Gallo, Zurich, Switzerland

[73] Assignee: Wirth, Gallo & Co., Zurich, Switzerland

[21] Appl. No.: 829,047

[22] Filed: Aug. 30, 1977

[30] Foreign Application Priority Data

Feb. 23, 1977 [CH] Switzerland ............... 002350/77

[51] Int. Cl.² .................. G01G 3/14; G01G 19/52
[52] U.S. Cl. .................... 177/210 FP; 177/50; 177/DIG. 3
[58] Field of Search ............... 177/50, 123, 210 FP, 177/DIG. 3, 185

[56] References Cited
U.S. PATENT DOCUMENTS

| 3,674,097 | 7/1972 | Gile | 177/210 FP X |
| 3,788,410 | 1/1974 | Allenspach et al. | 177/210 FP X |
| 3,828,869 | 8/1974 | Sellers | 177/50 |
| 3,860,802 | 1/1975 | Knothe et al. | 177/25 X |
| 3,921,736 | 11/1975 | Rogers | 177/210 FP X |
| 4,063,604 | 12/1977 | Rock | 177/210 FP X |

Primary Examiner—George H. Miller, Jr.
Attorney, Agent, or Firm—Stevens, Davis, Miller & Mosher

[57] ABSTRACT

A scale with a digital computing device and a digital display, in particular for weighing bulk goods, in which the weighing result is determined as a mean value over a measuring cycle, comprising means for assessing the difference between the results of two consecutive measuring cycles, means for comparing this difference with a pre-determined value and means for controlling the length of the measuring cycles in function of this comparison.

4 Claims, 4 Drawing Figures

SCALE, IN PARTICULAR FOR WEIGHING BULK GOODS

The invention concerns a scale with a digital computing device and a digital display, in particular for weighing bulk goods, in which the weighing result is determined as a mean value over a measuring cycle.

When bulk goods, including liquids, are dosed, this operation is generally preformed in two distinct phases. In the first one the scale with the package as the case may be — is quickly loaded with bulk goods up to a weight which is near the desired weight, but short of it. In the second phase the scale is loaded slowly until the desired weight is reached. Installations for weighing bulk goods applying such filling and weighing methods are known, e.g. from Swiss Pat. Nos. 488 173, 493 833 and 521 576. Analogue working scales with a hand are known, in which the position of the hand is compared electromagnetically with a desired position when the scale is used in an automatic or semi-automatic filling station. It is also known that the desired position of the hand can be combined with a time function during the filling process, so that the difference between the desired and the real positions of the hand remains small, so that the danger of overflow is avoided. Furthermore, filling installations are known in which besides the time separation into two phases a room separation with two filling devices is provided, partly with two scales. A device having a purely digital scale with vibrating strings is known from German patent application DOS 2 231 711, with which in the first phase the weighing process takes place with consecutive short measuring cycles of limited accuracy, in the second phase the accuracy being multiplied by ten, the length of each individual measuring cycle being also multiplied by ten.

Scales with hands cannot generally be applied satisfactorily because of the feedback on the result of the measurement by the devices coupled to the scale and because of the lack of flexibility of such scales. The two-phase process is more difficult to realize with analogue scales than with analogue-digital or with purely digital devices. In the latter two devices the goods can be filled during the first phase, in which the main quantity of goods is loaded on the scale working either under human or automatic control, with a speed which depends on the information about the weight available to the operator or on the time within which such information can be processed. It is possible to provide the operator with weight information in quick sequence by reducing the length of the basic measuring cycle. As during the first phase the final weighing is not performed, a slight inaccuracy can be tolerated. The change of the number of digits of the display when reducing the length of the basic measuring cycle is not satisfactory, because it causes erroneous reading and because the changeover from normal to shortened measuring cycle must be controlled from outside the scale, which makes its introduction in fully automatic weighing installations very cumbersome.

It is an object of the invention to provide a scale for bulk goods, including liquids, which avoids the above mentioned drawbacks, which is equally suited for operation by hand and for automatic operation and which in both modes automatically assesses and displays the weight information in the first phase in quick sequences without high precision and in the second phase in slower sequence but with the required higher precision.

The scale according to the invention is characterized by means for assessing the difference between the results of two consecutive measuring cycles, by means for comparing this difference with a predetermined value and by means for controlling the length of the measuring cycles as in function of this comparison.

In a particular embodiment of the invention, this scale comprises a reference oscillator, a counter for counting the oscillations of said reference oscillator with two alternatively selectable end values, a first and a second memory, a difference circuit, a comparison circuit with ajustable threshold value, a controller, said first memory storing the weighing result of a measuring cycle, said second memory storing the weighing result of the immediately preceding measuring cycle, said difference circuit computing the difference between the present and immediately preceeding measuring results and feeding it to said comparison circuit, the latter activating said controller depending on said difference being greater or smaller than said threshold value, so that said controller selects one of said end values for counting the oscillations of said reference oscillator, so that when said difference is greater than or equal to said threshold value a short measuring cycle follows and when it is smaller a long measuring cycle follows.

An embodiment and several variants of the invention are represented schematically.

FIG. 1 in the drawings is a block diagram of a first embodiment the scale of the invention.

Figure 1:
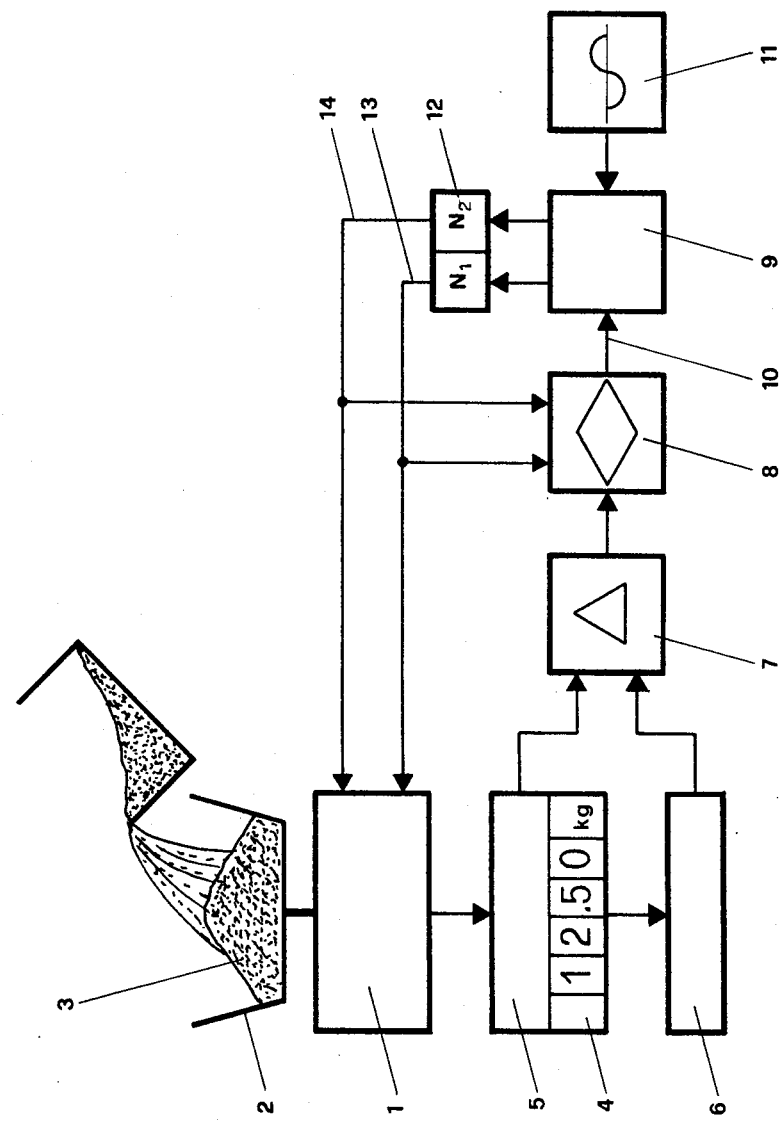

The embodiment according to FIG. 1 shows a scale 1 with a platform 2 which is loaded with bulk goods 3. Scale 1 is a digital scale or a scale with an analogue-digital-converter, which assesses or at least displays the weight of the loaded goods at regular intervals. Such a scale could be a one-string scale, an inclinaison scale with code disks, allowing static or serial reading of the load, or a scale with dynamometers, preferably a two-string scale of well known construction. Schematic block 1 contains not only all mechanical parts but also all electronic parts needed for assessment of the weighing result.

The weight measured during one measuring cycle is displayed by display 4 and stored in a memory 5. The result of the immediately preceding measuring cycle is stored in a memory 6. The difference $\Delta G$ of the contents of memories 5 and 6 is formed by a difference circuit 7 and fed into a comparison circuit 8 in which it is compared with a given threshold value $\Delta G_o$. This value $\Delta G_o$ is a pre-determined value equal to the product of a given value $M_o$ of quantity of goods per second (the filling speed) multiplied by the length of the last measuring cycle. As shown below, this length is equal to one of two values $N_1$ or $N_2$ which can be entered in circuit 8 by means of feedback lines 13, 14.

The values $$\Delta G_{o1} = M_o \times N_1$$

or $$\Delta G_{o2} = M_o \times N_2$$

are stored in circuit 8.

If the scale indicates that the weight is in the zero range, the shorter measuring cycle $N_1$ is preferred, so that at the beginning of a weighing operation, the first measuring cycle is always a short one.

A controller 9 is connected to circuit 8 by a line 10, it controls a counter 12. If the result ($\Delta G - \Delta G_o$) of the comparison performed by circuit 8 is greater or equal to zero, a voltage signal corresponding to a logical ONE is set on line 10. If this result is less than zero, the voltage signal on line 10 corresponds to a logical ZERO.

Figure 2:
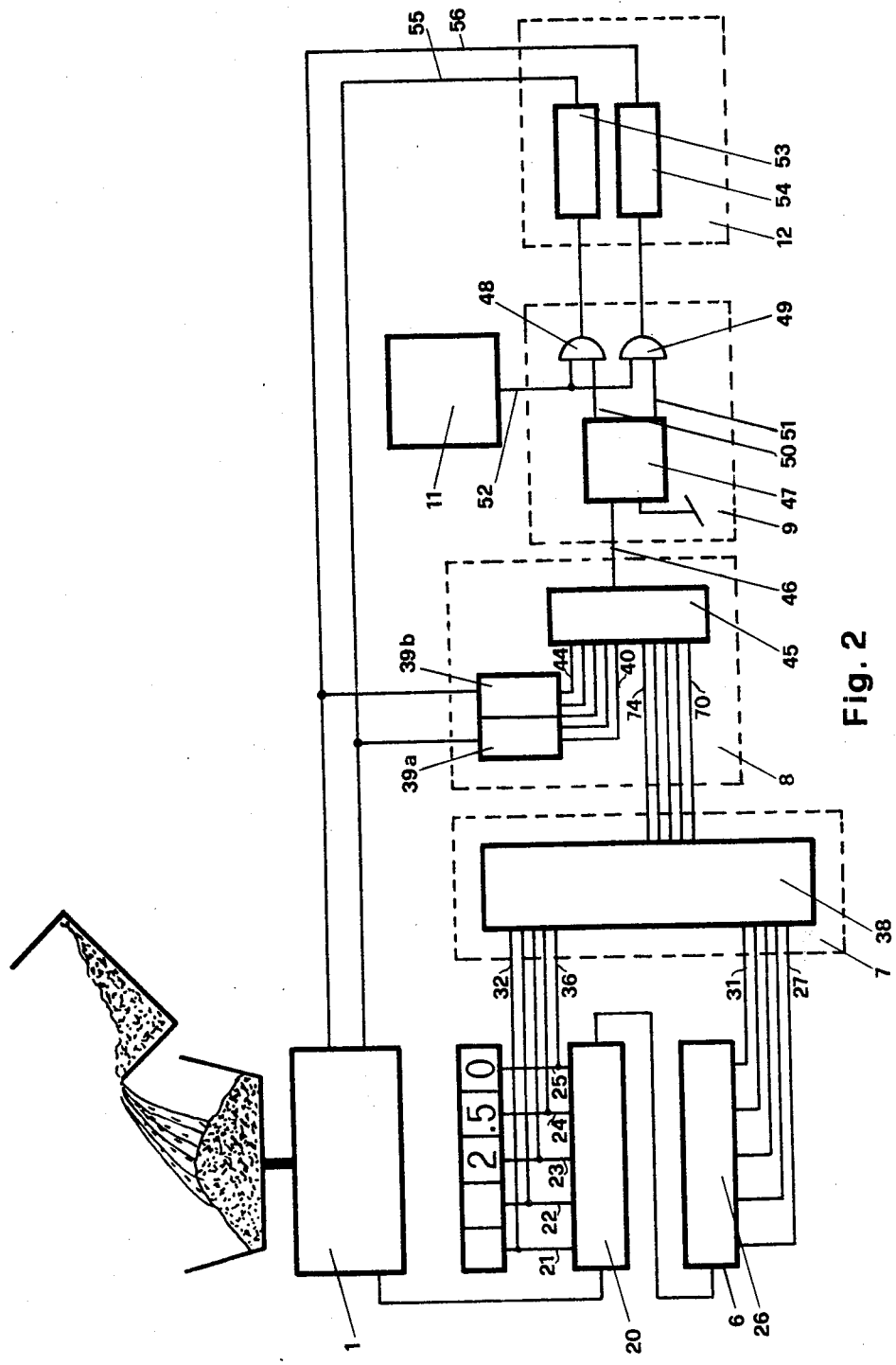
FIG. 2 is a detailed diagram of FIG. 1.

Controller 9 — as shown in FIG. 2 — generates from these signals ONE or ZERO control signals needed by counter 12 for counting $N_1$ or $N_2$ oscillations of a reference oscillator 11. If the result of the comparison performed by circuit 8 is greater than or equal to zero, then the smaller number $N_1$ of oscillations is counted, if it is less than zero, then the higher number $N_2$ of oscillations is counted. $N_1$ and $N_2$ are two pre-determined numbers which correspond to short or long measuring cycles. The length of a measuring cycle is thereby controlled by the filling speed, that is by the quantity of goods 3 falling on platform 2 per time unit. The control signals reach scale 1 over feedback lines 13, 14 and provoke — over line 13 — a short measuring cycle and — over line 14 — a long measuring cycle.

FIG. 2 shows the same embodiment as FIG. 1, but all blocks are replaced by an actual realization of all elements. Only scale 1 with its mechanical and electronic parts is not shown in detail. All scales of this type have in common, for structural reasons, the fact that the assessment of the weight requires a certain measuring cycle over which the weight is integrated and its mean value is formed. The latter is fed to memory 5 consisting of a shift register 20 with parallel outputs 21 to 25. Depending on the code chosen, for instance a binary coded decimal representation, these outputs 21–25 must be considered as comprising each four lines connecting shift register 20 with the five-digit display 4. After a measuring cycle the content of shift register 20 is transmitted to a shift register 26 forming memory 6. The outputs 27 to 31 of this shift register 26 must also be understood as comprising four lines. Outputs 21–25 are connected by means of lines 32 to 36 with a difference circuit 7 consisting of a full adder 38 set for forming differences. Outputs 27–31 of shift register 26 are also connected to adder 38. The latter computes the difference $\Delta G$ of the contents of shift registers 20 and 26 and transmits it over lines 70 to 74, to be understood each as a fourfold line, to comparison circuit 8. This comparison circuit 8 comprises two read-only stores 39a, 39b containing each one of the two possible values of $\Delta G_o$. They are linked by five lines 40 to 44, to be understood each as a fourfold line, to a full adder 45 which is part of comparison circuit 8. Adder 45 is set for forming differences and it generates ($\Delta G - \Delta G_o$) with the suitable sign. This sign appears at an output 46 of adder 45 as a ONE signal if positive or as a ZERO signal if negative, and is transmitted to controller 9. This controller comprises a flip-flop 47 and two AND-gates 48, 49. Flip-flop 47 has complementary outputs 50, 51. Output 50 is linked to AND-gate 48 and output 51 is lined to AND-gate 49. When a ONE signal appears at output 46, output 50 is activated, i.e. it has a voltage end corresponding to a ONE signal, output 51 having a voltage level corresponding to a ZERO signal. If the signal at output 46 is ZERO, the situation is reversed. Thereby one of the AND-gates 48, 49 is always in a state allowing A.C. oscillations of reference oscillator 11 in form of rectangular pulses to reach counter 12.

In the embodiment represented, counter 12 comprises two counting devices 53, 54, counting device 53 being connected to AND-gate 48 and counting the smaller number $N_1$ of oscillations of oscillator 11 and counting device 54 being connected to AND-gate 49 and counting the higher number $N_2$. This means that these counting devices 53, 54 have a capacity $N_1$, $N_2$ respectively. As soon as these capacities are exceeded an overflow signal is generated at the output of the relevant counting device 53 or 54 and transmitted over lines 55, 56 to scale 1. The control signals for the scale are then derived in well known manner from this overflow signal. These overflow signals on lines 55, 56 are transmitted to read-only stores 39a, 39b so that a signal on line 55 generates a reading of the smaller value of $\Delta G_o$ and a signal on line 56 generates a reading of the higher $\Delta G_o$ value from stores 39a, 39b. For the sake of simplicity, no supply lines for the different parts have been shown. Also lines needed for clocking signals and for synchronization have not been shown.

Figure 3:
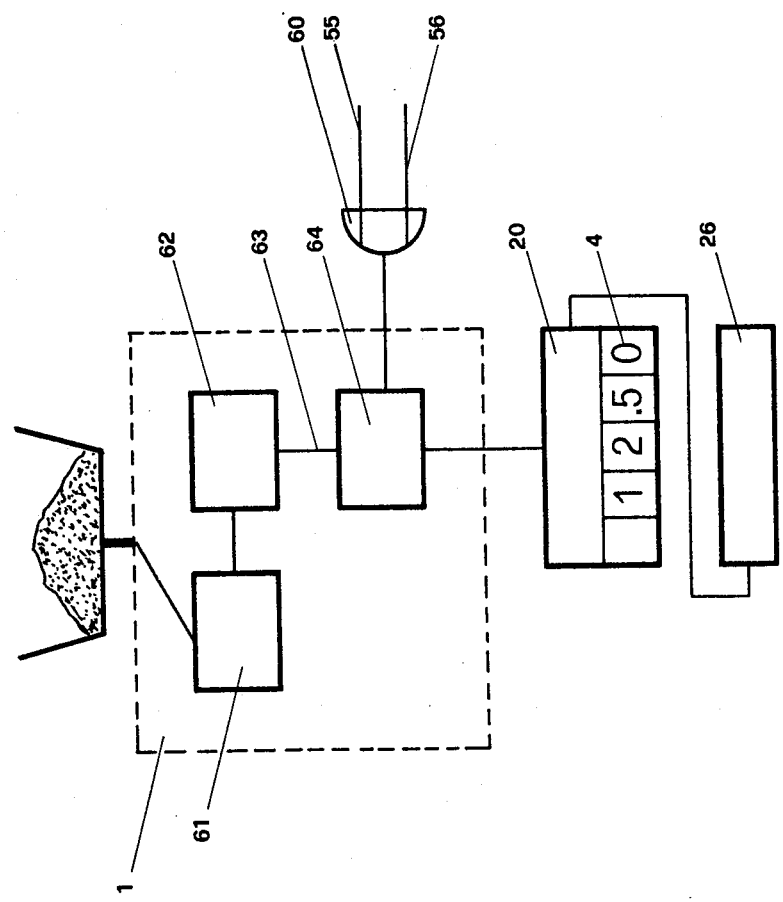
FIG. 3 is a first variant.

If scale 1 is an inclinaison scale with code disks, as assumed in FIG. 3, lines 55, 56 are connected to an OR-gate 60. An optical or magnetic recorder 61 reads the code disks and generates in well known manner electrical pulses which are counted in a counter 62. The latter is connected by means of the necessary number of parallel lines, shown here as one connection 63, over a multiple gate 64 to shift register 20, which in this embodiment is fed in parallel. Further signal processing is as described in relation with FIG. 2 over shift register 26 and display 4.

Figure 4:
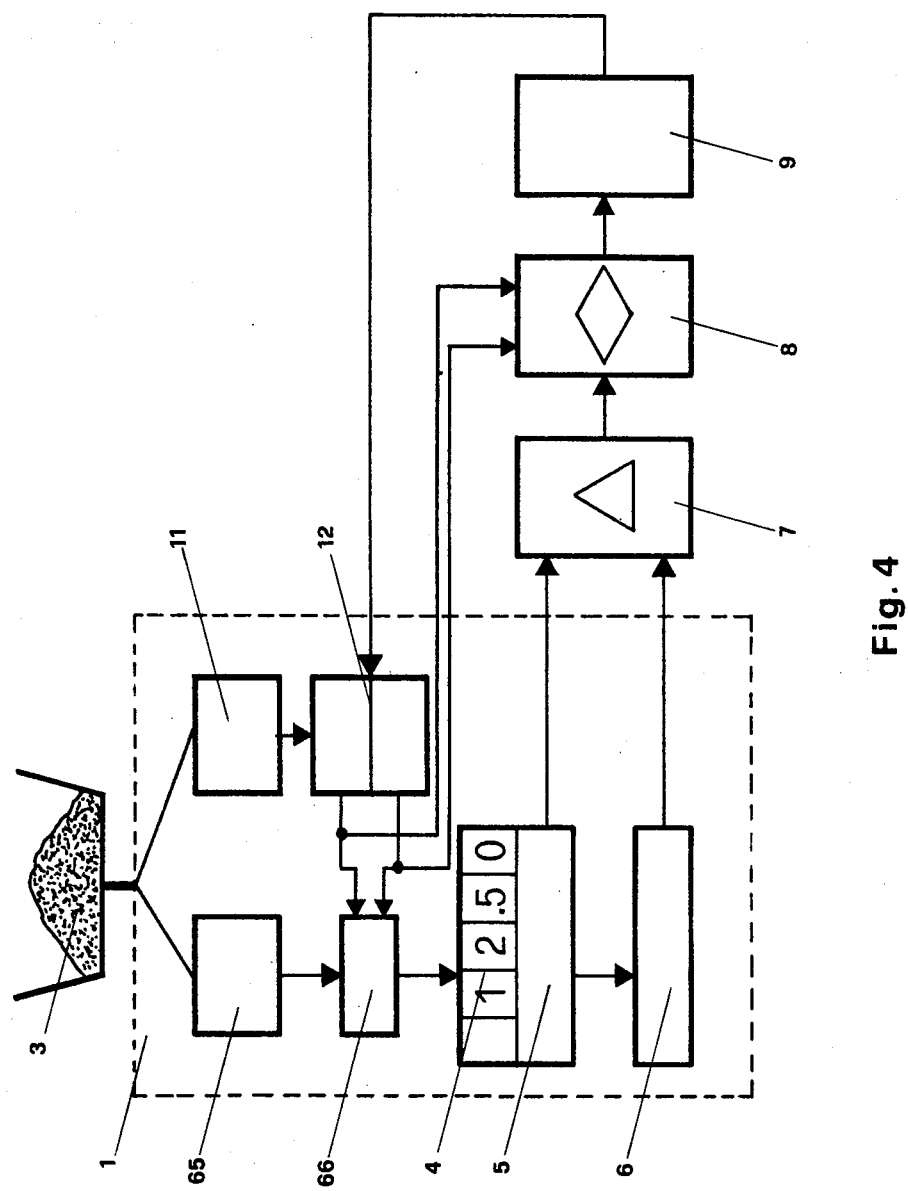
FIG. 4 is a second variant.

In the embodiment according to FIG. 4 scale 1 is a scale with two vibrating strings of well known construction, for instance as desribed in Swiss Pat. No. 447 636, 447 653 or 492 961. In such a scale the two vibrating strings can each be considered as an oscillator. One string, the mechanical tension of which is lowered by the load on the platform of the scale, will be used as reference oscillator 11. The other string is shown schematically as oscillator 65. Counter 12 is provided in such scales in order to assess the time period during which the oscillations of oscillator 65 are counted, the frequency of which is raised by the load of the scale. A computing device 66 comprises circuits computing in known manner the weight of goods 3 from the frequencies of oscillators 11 and 65. Memory 5 and display 4 are also elements of this scale. Memory 6, difference circuit 7, comparison circuit 8 and controller 9 are as described in relation with FIGS. 1 and 2.

I claim:

1. A scale for weighing bulk goods comprising means for measuring the weight of bulk goods,
a digital computing device responsive to said means for measuring and a digital display coupled to said computing device for respectively computing and displaying a weight measurement, said weight measurement being the determined mean weight of said bulk goods over a measuring cycle,
means for determining the difference between two computed weight measurements taken over two consecutive measuring cycles,
means for comparing said difference with a predetermined value and for producing a control signal corresponding to the result of said comparison, and
means responsive to said control signal for controlling the length of said measuring cycle in accordance with the result of the comparison of said difference with said predetermined value.

2. A scale for weighing bulk goods comprising:
means for measuring the weight of bulk goods,
a digital computing device responsive to said means for measuring and a digital display coupled to said computing device for respectively couputing and displaying a weight measurement, said weight measurement being the determined mean weight of said bulk goods over a measuring cycle,
a reference oscillator,
a counter for counting the oscillations of said reference oscillator to one of two alternatively selectable end values for establishing two alternatively selectable measuring cycles,
a first memory storing weight measurement of a measuring cycle,
a second memory storing a weight measurement of an immediately preceding measuring cycle,
a difference circuit for computing the difference between the weight measurements stored in said first and second memories and forming a difference signal;
a comparison circuit responsive to said difference signal for formulating a control signal indicating whether said difference is greater than or less than a threshold value, and
a controller responsive to said control signal for selecting one of said counter end values such that when said difference is greater than or equal to said threshold a short measuring cycle corresponding to one of said end values is selected as a following measuring cycle and when said difference is smaller than said threshold value a long measuring cycle corresponding to the other of said end values is selected as the following measuring cycle.

3. The scale as in claim 2 wherein said means for measuring employs a pair of vibrating strings for sensing a load, said computing device being responsive to the frequency of the oscillation of said strings for computing a weight measurement, one of said strings serving as said reference oscillator and said counter setting said measuring cycle by establishing the time period during which oscillations of said other string are counted by said computing device.

4. The scale as in claim 2 wherein said means for measuring comprises a recorder for reading a code disk and generating electrical pulses in accordance with the weight of an object, and said computing device includes a second counter responsive to said electrical pulses, a multiple gate circuit for passing counted electrical pulses to said display and first memory device, and a gate circuit control responsive to said selectable counter end values for controlling the operation of said multiple gate circuit to set a measuring cycle.

* * * * *